United States Patent Office 3,162,574
Patented Dec. 22, 1964

3,162,574
ANTHELMINTIC COMPOSITION CONTAINING SUBSTITUTED BENZIMIDAZOLE AND PHENOTHIAZINE AND METHOD OF USING SAME
Bruce Adam Forsyth, Croydon, Victoria, Australia, assignor to Imperial Chemical Industries of Australia and New Zealand Limited, Melbourne, Victoria, Australia, a company of Victoria, Australia
No Drawing. Filed Apr. 10, 1963, Ser. No. 271,858
Claims priority, application Australia, Apr. 24, 1962, 16,833/62
13 Claims. (Cl. 167—53)

This invention relates to new compositions of matter which have useful biological properties and more particularly it relates to new anthelmintic compositions.

In the article by H. D. Brown, A. R. Matzuk, I. R. Ilves, L. H. Peterson, S. A. Harris, L. H. Sarett, J. R. Egerton, J. J. Yakstis, W. C. Campbell and A. C. Cuckler in the J.A.C.S., vol 83, April 1961, pp. 1764–1765 and in South African patent application No. 60/5083, priority (U.S.A.) 18.1.60 and 17.3.60, a new class of benzimidazole anthelmintic agents has been disclosed and a number of representative compounds of this family have been described. Of these compounds, the benzimidazole derivatives which have attached to the 2-position of the benzimidazole ring a five-membered heterocyclic radical containing nitrogen and sulphur can only be prepared in a sequence of steps which produce relatively low yields, so that the raw material efficiency from first starting material to end product is low and the compounds are very expensive. The cheaper derivatives, such as 2-phenyl or 2-furyl benzimidazole, on the other hand, require higher dosages for equivalent biological activity and, in the case of the furyl derivative, also begin to produce toxic effects on mammals at the level at which they effect anthelmintic control. Yet another long-established anthelmintic, phenothiazine, suffers from the disadvantage that relatively large quantities are required for complete control, particularly of certain species of worms. We have now discovered that mixtures of the above-mentioned, disclosed, and of certain other benzimidazole derivatives with phenothiazine produce anthelmintic activity substantially greater than could be predicted from their additive biological properties. In the case of toxic benzimidazole derivatives such as the 2-furyl benzimidazole, the toxicity threshold need not be exceeded and effective control can be attained at safe concentrations. Furthermore, in the said mixtures the phenothiazine component need not be present in a state of five-division, nor of maximum purity, to enable it to exert its full anthelmintic activity, as in the case when it is formulated, per se.

Accordingly I provide new compositions of matter comprising components A and B, where A is a 2-substituted benzimidazole of the general formula:

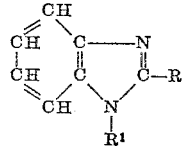

wherein the benz-ring may optionally bear substituents, for example halogen or lower alkyl or alkoxy groups, wherein R stands for a five-membered heterocyclic radical containing one nitrogen and one sulphur atom; thienyl; furyl; phenyl; o-substituted phenyl where the ortho substituent is a methyl, chloro, bromo or nitro group; p-amino-, alkylamino-, or dialkylamino-phenyl; or pyridyl; and wherein $R^1$ stands for hydrogen or a lower alkyl, a lower alkenyl or a $\beta\beta\beta$-trichloro-$\alpha$-hydroxyethyl group, and acid addition salts thereof, and where B is phenothiazine.

Compounds A suitable for admixing to phenothiazine are 2-phenylbenzimidazole, 2-o-chlorophenyl-benzimidazole, 5-chloro-2-phenylbenzimidazole, 5-methoxy-2-phenylbenizimidazole, 2-o-tolybenzimidazole, 2-p-aminophenyl)benzimidazole, 2-(p - dimethylaminophenyl)benzimidazole 2-(2'-furyl)-benzimidazole, 2 - (4' - thiazolyl)benzimidazole, 2 - (5'-thiazolyl)benzimidazole, 2 - (2'-thienyl benzimidazole 2-(3'-pyridyl)benzimidazole, 2-4'-pyridyl) benzimidazole and 1 - ($\alpha$ - hydroxy - $\beta\beta\beta$ - trichorethyl)- 2-phenylbenzimidazole. Particularly effective mixtures of A and B contain as compound A one of the following benzimidazole: 2-phenyl-benzimidazole, 2-(2'-furyl)benzimidazole, 2-(2'-thienyl)-benzimidazole, 2-(4'-thiazolyl)benzimidazole and 2-(4'-thiazolyl) - 5 - methylbenzimidazole. The most preferred compositions are mixtures of 2-phenylbenzimidazole and phenothiazine and 2-(2'-thienyl)benzimidazole and phenothiazine.

The compound A as defined above is referred to below as "benzimidazole derivative."

We also provide as a new composition of matter a mixture of a benzimidazole derivative with phenothiazine together with an inert, non-toxic carrier or diluent for the active ingredients A and B.

As stated above we have found that the new compositions of matter possess anthelmintic activity greater than the sum of the activities predictable from the individual components and thus that they are effective in lower concentrations than predictable in the removal of a wide spectrum of worm species, and moreover of a wide range of developmental forms of these species, in laboratory and domestic animals.

One method of demonstrating greater-than-additive anthelmintic activity in a drug mixture is to find the doses of the components of the mixture which, when administered alone, produce an equivalent reduction in worm count. When half quantities of these equivalent doses are administered together as a mixture they would not be expected to produce an effect which is greater than the effect produced by full doses of either component of the mixture administered alone if the effects were merely additive. In other words if X mg./kg. of drug A produced the same effect as Y mg./kg. drug B then effect of ½X mg./kg. drug A+½Y mg./kg. drug B should not be greater than the effect of X mg./kg. drug A or Y mg./kg. drug B if the effects were merely additive. In the experimental portion of this specification evidence is presented which shows that mixtures containing one-half equally active doses of phenothiazine and the said benzimidazoles produce a much greater reduction in worm count than that arising from the full dose of phenothiazine or the full dose of the said benzimidazoles alone.

In order to express mathematically the degree of additive effect in a drug mixture on the basis of the known properties of the components of the mixture, the scale of measurement of the effect must be properly chosen. Two or more parts of a dose of a single drug act additively so that it is necessary to find a scale of measurement of action for which the action increases proportionally with the dose. This we have done for the anthelmintic actions of phenothiazine on the one hand and the said benzimidazole derivatives on the other and in both cases we have shown, for example in mice and in sheep, that when the anthelmintic effect is measured as the logarithm of the extent to which the worm count is reduced, this effect is proportional to the dose, i.e. the logarithms are approximately linear with dose. Thus effects measured on this scale are expected to be additive and thereby provide a basis for assessing more-than-additive (or less-than-additive) effect in mixture. In ordinary terms this relationship would lead one to expect the following type of result:

If a dose $x$ of drug A reduces the number of worms to a proportion $p$ and a dose $y$ of drug B reduces the number of worms to a proportion $q$, then the combined dose $x$ of A and $y$ of B would be expected to reduce the number of worms to a proportion $pq$.

In many of the tables in the experimental portion of this specification the figures detailing actual worm counts are accompanied by figures within brackets giving this predicted count $pq$, i.e. the expected result of the combined dose on the assumption that the effects of the two components are additive. It will readily be seen that in almost all cases the actual result is better than the expected result and in most cases is very much better.

I have found that the mixtures of this invention can be used to eliminate infestations of, for example, *Nippostrongylus muris* from mice and we have further found that they may be used to eliminate infestations of for example *Haemonchus contortus*, Ostertagia spp., Trichostrongylus spp., Cooperia spp., Nematodirus spp., Oesophagostomum spp. and *Chabertia ovina* from sheep; moreover these infestations are eliminated whether the infesting nematodes are present in the mature form or in certain immature stages.

Furthermore I have found that the random variation of effectiveness between sheep of the mixtures of this invention is smaller than the variation predictable from the random variations of the individual biologically active constituents of the mixture. This means that the anthelmintic effect is not only greater but also more consistent with sheep under varying conditions, both physical and climatic.

I have also found, possibly as a direct result of the more-than-additive anthelmintic utility of the mixtures of the invention, that the phenothiazine component thereof can be provided in a degree of purity, for example of upwards of about 75% purity, and in a state of division, for example in a particle size of specific surface area upwards of about 3,000 cm.$^2$/g., markedly less than would be necessary for its effective use as an anthelmintic per se. According to a further feature of the invention we therefore provide the aforesaid new compositions of matter wherein the phenothiazine component is of between 75% and 100% purity, for example suitably between 80% and 95% purity and of a particle size having a specific surface area of between 3,000 cm.$^2$/g. and 30,000 cm.$^2$/g., for example suitably between 8,000 cm.$^2$/g. and 20,000 cm.$^2$/g.

At the dosage levels required for control of the infestation the compositions of the invention are non-toxic to mammals; this is particularly remarkable in the case of some toxic benzimidazoles such as furyl benzimidazole, which when used on its own at levels achieving anthelmintic control may be toxic to mammals. It is normally proposed to administer the compositions orally to animals suffering from worm infestations.

The compositions of this invention in general may contain standard excipients known to pharmacy, for example solvents, inert diluents, fillers, emulsifying, dispersing and disintegrating agents, bacteriostats, bactericidal agents, sporicidal agents, stabilising agents, thickening agents, preservatives and pharmaceutically-acceptable colouring agents. The compositions may also optionally contain other drugs or additives of veterinary utility and/or mineral salts. Thus compositions such as are suitable for oral administration may be liquid or solid compositions. Particularly suitable flowable compositions are the dispersions of the two active ingredients, either by themselves or suspended in a non-toxic pharmaceutically acceptable carrier, in non-toxic solvents, particularly water.

Solid compositions may be in the form of tablets, slugs, pellets or capsules made up with standard tablet-forming excipients. Alternatively compositions for oral administration may be contained in foodstuffs. The solid compositions may be made dispersible in water by the admixture of wetting agents. A preferred solid mixture is a dispersible powder. The surfactants used as emulsifiers or dispersing agents may be of the non-ionic, cationic, anionic type. Examples of non-ionic surfactants are the condensation products of ethylene oxide with fatty alcohols or the condensation products of ethylene oxide with alkylated phenols. A suitable anionic surfactant is the sodium salt of alkylnaphthalene sulphonic acid. Other suitable surfactants are known.

Veterinary drugs and/or minerals which may be present in the veterinary compositions of this invention depending upon the mode of administration of the said compositions include for example cyanacethydrazide, hexachloroethane, piperazine, 1-diethyl-carbamyl - 4 - methyl-piperazine, carbon tetrachloride, 3,3',5,5',6,6'-hexachloro-2:2'-dihydroxydiphenylmethane, sodium bicarbonate, tetrachloroethylene.

In the particular case, the preferred concentrations of the active ingredients are between 25 and 150 mg. of 2-phenylbenzimidazole or 2-(2'-thienyl)benzimidazole and between 400 and 100 mg. of phenothiazine per kg. of bodyweight; the preferred range for 2-(2'-furyl)benzimidazole is 5 to 50 mg. and for the benzimidazole derivatives having in their 2-position a five-membered heterocyclic radical containing both nitrogen and sulphur are 5 to 35 mg. of the benzimidazole derivative and 400 to 100 mg. of the phenothiazine. In general, when a higher level of phenothiazine is chosen, it is usually complemented by a low level of the benzimidazole derivative and vice versa. The most preferred ranges, however, are the intermediate dosage levels, i.e. when one ingredient is 2-phenylbenzimidazole or a substituted 2-phenylbenzimidazole or a thienylbenzimidazole or a pyridylbenzimidazole, between 50 and 100 mg. of the benzimidazole and 300 to 200 mg. of phenothiazine; with the heterocyclic nitrogen and sulphur containing benzimidazole derivatives, 10 to 30 mg. of the benzimidazole derivative and 400 to 200 mg. of phenothiazine are most preferred.

A preferred, simple composition is obtained by grinding the active constituents with one tenth of their weight of an alkylphenyl condensate with ethylene oxide and dispersing 50 g. of the resultant mixture in 100 mls. of water so that the resultant dispersion contains 5 g. of the active mixture per 100 mls. of water. The appropriate volume of aqueous dispersion to obtain the desired dosage per kg. of bodyweight is then administered "per os" by means of a drench gun.

A preferred solid formulation consists of tablets made from 500 parts of the two active ingredients finely ground, thoroughly mixed with 250 parts of maize starch, 500 parts of lactose and 5 parts of magnesium stearate which mixture is compressed into slugs, crushed, passed through a (5 mesh) screen, compressed into tablets of 5 g. weight each. The tablets may also be coated in a tablet-coating pan with the simultaneous addition of a sufficient quantity of a solution of 20 parts of white beeswax in 80 parts of petroleum ether (B.P. 120–140° C.). The tablets thus obtained are suitable for oral administration in the treatment of helminthiasis in domestic animals and may be injected into the sheep "per os" by means of a so-called balling gun.

Another preferred composition is a dispersible powder comprising 90 parts of components A and B as defined, in the proportions stated above, finely ground and mixed with a minor proportion, e.g. 2 to 5 parts, of an inert diluent such as diatomaceous earth or china clay, between 2 and 5 parts of sodium chloride, 0.2 to 1 part of sodium carbonate, 0.5 to 2 parts of oxgall and 0.5 to 3 parts of a dispersing agent, e.g. a product available under the registered trademark "Belloid" NW, all parts being by weight.

According to a further feature of this invention we also provide a process for the treatment of helminthiasis in mammals, particularly in domestic animals, which comprises the administration to said animals of a mixture of a benzimidazole derivative as defined and phenothiazine.

The treatment may be carried out using the active ingredients by themselves; the benzimidazole derivative may also be in the form of an aqueous solution of the hydrochloride. The preferred method of treatment, however, is the administration of the active compounds in suitable formulations which facilitate administration, control of dosage level and assist the biological activity.

The invention is illustrated by, but not limited to, the following experimental data:

The anthelmintic activity of phenothiazine, the said benzimidazoles, and mixtures of phenothiazine and the said benzimidazoles has been assessed in 18–20 g. mice, reared under specific pathogen-free conditions, and experimentally infected with *Nippostrongylus muris,* a nematode parasitic in the small intestine. Suspensions of the various drugs and/or drug combinations suitable for administration to mice were prepared by milling the active agent(s) with a dispersing agent containing 0.1% Lissapol "C," 0.1% Lissapol "NX" and 0.1% Dispersol "OG," for 24 hours prior to administration. In all cases the appropriate treatment was administered in 0.5 ml. suspension given orally to mice on three successive days commencing six days after infection. The animals were starved on the 10th day after infection and their worm burdens assessed at post mortem examination carried out on the following day. Anthelmintic activity was assessed by comparing the worm burdens of treated and control animals.

Each benzimidazole/phenothiazine combination was studied separately. The anthelmintic activity of each component of the mixture was examined alone and in combination with all doses of the other component. Thus a typical experiment assessed the action of three graded doses of phenothiazine, four graded doses of the benzimidazole in question, and the twelve possible combinations of these doses. Groups of six infected mice were randomly assigned to each of these nineteen treatment regimes. A similar group of six animals received 0.5 ml. dispersing agent only, and served as controls to provide an estimate of the worm burden before treatment.

Results of experiments exemplifying the greater-than-additive anthelmintic activity of the various benzimidazole/phenothiazine mixtures are presented in Tables 1–5 below. The figure indicates the mean number of worms remaining in the mice following treatment with phenothiazine alone, or benzimidazole alone, or phenothiazine/benzimidazole combinations at the dosage levels indicated (dosages in all cases refer to mgs./20 gram mouse). Figures in parenthesis are the expected worm counts of the phenothiazine/benzimidazole mixture calculated on the assumption that their effects are additive (i.e. *pq* values). It can be seen that the results actually obtained in all cases are significantly better than those which would have been obtained had the effects been merely additive.

EXAMPLE 1

Anthelmintic activity in mice of phenothiazine, 2-phenylbenzimidazole and mixtures thereof.

Table 1

| Dose of 2-phenylbenzimidazole | Dose of phenothiazine | | |
|---|---|---|---|
| | 0 | 10 | 25 |
| 0 | 106 | 98 | 94 |
| 2.5 | 64 | 51 (59) | 21 (57) |
| 5 | 28 | 13 (26) | 6 (25) |

EXAMPLE 2

Anthelmintic acivity in mice of phenothiazine, 2-o-chlorophenylbenzimidazole and mixtures thereof.

Table 2

| Dose of 2-o-chlorophenyl benzimidazole | Dose of phenothiazine | | |
|---|---|---|---|
| | 0 | 5 | 10 |
| 0 | 159 | 166 | 162 |
| 5 | 114 | 87 (114) | 69 (114) |
| 10 | 53 | | 12 (53) |

EXAMPLE 3

Anthelmintic activity in mice of phenothiazine, 2-(2'-thienyl)benzimidazole and mixtures thereof.

Table 3

| Dose of 2-(2'-thienyl)-benzimidazole | Dose of phenothiazine | | | |
|---|---|---|---|---|
| | 0 | 5 | 10 | 25 |
| 0 | 169 | 169 | 153 | 103 |
| 1 | 130 | 104 (130) | 99 (118) | 82 (79) |
| 2.5 | 74 | 46 (74) | 40 (67) | 3.4 (45) |
| 5 | 34 | 1 (34) | 2 (31) | 0 (21) |

EXAMPLE 4

Anthelmintic activity in mice of phenothiazine, 2-(2'-furyl)benzimidazole and mixtures thereof.

Table 4

| Dose of 2-(2'-furyl) benzimidazole | Dose of phenothiazine | | | |
|---|---|---|---|---|
| | 0 | 5 | 10 | 25 |
| 0 | 108 | 58 | 80 | 51 |
| .25 | 82 | 55 (44) | 58 (61) | 20 (39) |
| .5 | 96 | 31 (52) | 24 (71) | 4 (45) |
| 1.0 | 50 | 25 (27) | 0.7 (37) | 0.6 (24) |

Because of apparent inconsistencies in the results, more results are included in this table than the previous two. There is also an inconsistency between this and the other tables in that now phenothiazine alone produces an appreciable effect. It is clear, however, that the two drugs enhance each other. For example, 25 mgs. of phenothiazine alone reduces the worm count to approximately one half, and 1 mg. of 2-(2'-furyl)benzimidazole also has a similar effect. The two together would then be expected to reduce the worm count to ¼, i.e. to about 27, but the actual reduction is very much greater. Again starting from the evidence that 25 mgs. of phenothiazine and 1.0 mg. of 2-(2'-furyl)benzimidazole separately are about equally effective, the table shows that a dose of less than one half of this amount of phenothiazine (10 mgs.) combined with a dose of one half the above amount of 2-(2'-furyl)benzimidazole (i.e. 0.5 mg.) produces a much greater effect. Similarly, 5 mgs. of phenothiazine combined with .25 mg. of 2-(2'-furyl)benzimidazole gives an effect much greater than either 10 mgs. of phenothiazine alone or 0.5 mg. of 2-(2'-furyl)benzimidazole alone.

EXAMPLE 5

Anthelmintic activity in mice of phenothiazine, 2-(4'-thiazolyl)benzimidazole and mixtures thereof.

Table 5

| Dose of 2-(4'-thiazolyl)-benzimidazole | Dose of phenothiazine | | | |
|---|---|---|---|---|
| | 0 | 5 | 10 | 25 |
| 0 | 106 | 102 | 98 | 94 |
| .1 | 65 | 41 (63) | 26 (60) | 14 (58) |
| .25 | 44 | 31 (42) | 20 (41) | 5 (39) |

The anthelmintic acivities of phenothiazine/benzimidazole mixtures have also been assessed in sheep by the following procedure.

Suspension of phenothiazine, the said benzimidazole and mixtures of phenothiazine and the said benzimidazoles suitable for dosing to sheep were prepared by milling the active agent(s) thoroughly with water containing either 0.25% "Lubrol" E or 0.25% "Lissapol" NX as dispersing agent using a ball mill. In all cases the volume of water added was adjusted so that the appropriate dose of drug to be administered per kg. body weight was contained in 1–2 ml. suspension. The resultant aqueous suspensions were administered per os, by means of an oesophageal tube, to sheep harbouring a variety of naturally occurring nematodes parasitic in the gastorintestinal tract. The effect of treatment was judged by comparing the number of worms found in the alimentary tracts of treated and control animals at post-mortem examination 5 days after dosing. Whenever possible counts were made on the following worm genera: Haemonchus, Ostertagia and *Trichostrongylus axei* of the abomasum; Trichostrongylus, Cooperia and Nematodirus of the small intestine; and Oesophagostomum, Trichuris and Chabertia of the caecum and large intestine.

EXAMPLE 6

The results of dosing groups of 6–15 sheep with various levels of phenothiazine, 2-phenylbenzimidazole, and combinations thereof are shown in Table 6. The various treatments and the activity against the different worm genera can be ascertained by reference to the horizontal and vertical headings. The mean number of worms surviving treatment are indicated in the appropriate position and the figures in parentheses give the predicted results (i.e. $pq$ values) based on the assumption of a purely additive effect between the two compounds.

Table 6

| Genus of worm | Dose of phenothiazine (mg./kg.) | | | | Dose of 2-phenyl-benzimidazole (mg./kg.) |
|---|---|---|---|---|---|
| | 0 | 200 | 300 | 400 | |
| Haemonchus | 457 | 0.86 | 0.21 | 0.37 | 0 |
| | 27 | 0 (0) | 0 (0) | 0 (0) | 75 |
| Ostertagia | 4,690 | 1,390 | 1,100 | 1,130 | 0 |
| | 1,020 | 81 (302) | 54 (239) | 60 (246) | 75 |
| T. axei | 3,570 | 1,000 | 770 | 503 | 0 |
| | 673 | 36 (189) | 166 (145) | 36 (95) | 75 |
| Trichostrongylus | 20,100 | 12,800 | 10,100 | 6,840 | 0 |
| | 474 | 25 (301) | 35 (238) | 29 (161) | 75 |
| Nematodirus | 1,440 | 691 | 347 | 174 | 0 |
| | 537 | 190 (258) | 68 (129) | 47 (65) | 75 |
| Cooperia | 200 | 163 | 45 | 40 | 0 |
| | 191 | 136 (156) | 34 (43) | 24 (38) | 75 |
| Chabertia | 73 | 56 | 45 | 30 | 0 |
| | 69 | 15 (53) | 9.6 (43) | 1.1 (28) | 75 |
| Oes. venulosum | 3.2 | 8.3 | 4.1 | 5.2 | 0 |
| | 9.1 | 7.0 (24) | 5.5 (12) | 3.2 (15) | 75 |

EXAMPLE 7

The results of a further series of experiments using groups of 6–10 sheep to assess anthelmintic activity are exemplified in Tables 7, 8 and 9.

Table 7

PHENOTHIAZINE (PT) AND 2-PHENYLBENZIMIDAZOLE (PB)

| Genus of worm | Dose, mg./kg. | | | |
|---|---|---|---|---|
| | 0 | 300PT | 100PB | 300PT+100PB |
| Ostertagia | 4,315 | 2,255 | 2,840 | 60 (1,484) |
| T. axei | 3,310 | 2,010 | 2,560 | 45 (1,555) |
| Trich. spp | 19,960 | 14,660 | 1,480 | 125 (1,087) |
| Nematodirus | 7,965 | 1,985 | 7,400 | 645 (1,844) |
| Chabertia | 75 | 24 | 19 | 8 (6) |
| Oes. venulosum | 74 | 50 | 69 | 60 (47) |

Table 8

| Genus of worm | Dose, mg./kg. | | | |
|---|---|---|---|---|
| | 0 | 300PT | 100PB | 300PT+100PB |
| Haemonchus | 1,800 | 0 | 460 | 0 (0) |
| Ostertagia | 1,750 | 340 | 360 | 0 (70) |
| T. axei | 810 | 480 | 60 | 0 (36) |
| Trichostrongylus | 13,880 | 5,740 | 2,360 | 0 (976) |
| Nematodirus | 880 | 680 | 840 | 10 (649) |
| Chabertia | 23 | 5 | 2 | 0 (0.4) |
| Oesophagostomum | 24 | 5 | 19 | 0 (4) |

Table 9

| Location and species worm | Dose, mg./kg. | | | |
|---|---|---|---|---|
| | 0 | 300PT | 100PB | 300PT+100PB |
| Abomasum: | | | | |
| Ostertagia | 1,273 | 305 | 350 | 4 (84) |
| Trichostrongylus | 952 | 190 | 375 | 0 (75) |
| Small Intestine: | | | | |
| Trichostrongylus | 1,950 | 422 | 800 | 83 (173) |
| Cooperia | 555 | 73 | 80 | 0 (11) |
| Nematodirus | 8,483 | 2,550 | 4,750 | 767 (1,428) |
| Immature worms | 966 | 500 | 733 | 333 (379) |

EXAMPLE 8

Table 10 shows the anthelmintic activity, as assessed groups of 10 sheep, of phenothiazine, 2-(2′-furyl)benzimidazole and mixtures thereof.

Table 10

PHENOTHIAZINE (PT) AND 2-(2′-FURYL) BENZIMIDAZOLE (FB)

| Species of worm | Dose mg./kg. | | | |
|---|---|---|---|---|
| | 0 | 300PT | 20FB | 300PT+20FB |
| Haemonchus | 1,160 | 0 | 640 | 0 (0) |
| Ostertagia | 1,870 | 44 | 880 | 10 (207) |
| T. axei | 840 | 80 | 160 | 0 (15) |
| Trichostrongylus | 8,640 | 3,420 | 800 | 0 (317) |
| Nematodirus | 1,640 | 260 | 1,160 | 5 (184) |
| Chabertia | 36 | 3 | 4 | 0 (0.3) |
| Oesophagostomum | 24 | 5 | 21 | 0 (4) |

EXAMPLE 9

Table 11 shows the anthelmintic activity, as assessed in groups of 10 sheep, of phenothiazine, 2-(4′-thiazolyl)benzimidazole and mixtures thereof.

Table 11

PHENOTHIAZINE (PT) AND 2-(4′-THIAZOLYL) BENZIMIDAZOLE (TB)

| Species of worm | Dose mg./kg. | | | |
|---|---|---|---|---|
| | 0 | 300PT | 15TB | 300PT+15TB |
| Haemonchus | 830 | 0 | 760 | 0 (0) |
| Ostertagia | 3,480 | 840 | 1,720 | 0 (376) |
| T. axei | 1,100 | 320 | 200 | 0 (58) |
| Trichostrongylus | 5,340 | 3,160 | 540 | 0 (320) |
| Nematodirus | 1,640 | 860 | 880 | 80 (461) |
| Chabertia | 124 | 24 | 63 | 1 (12) |
| Oesophagostomum | 74 | 31 | 10 | 0 (4) |

EXAMPLE 10

Table 12 shows the anthelmintic activity, as assessed in groups of 10 sheep, of phenothiazine, 2-(4′-thiazolyl)-5-methylbenzimidazole and mixtures thereof.

Table 12
PHENOTHIAZINE (PT) AND 2-(4'-THIAZOLYL)-5-METHYL-BENZIMIDAZOLE (TMB)

| | Dose mg./kg. | | | |
|---|---|---|---|---|
| | 0 | 300PT | 20TMB | 300PT+20TMB |
| Haemonchus | 670 | 0 | 590 | 0 (0) |
| Ostertagia | 1,750 | 610 | 2,960 | 0 (1,011) |
| T. axei | 960 | 380 | 400 | 0 (158) |
| Trichostrongylus | 6,280 | 2,980 | 680 | 0 (323) |
| Nematodirus | 890 | 410 | 560 | 20 (258) |
| Chabertia | 56 | 24 | 40 | 8 (17) |
| Oesophagostomum | 48 | 12 | 8 | 6 (2) |

EXAMPLE 11

0.45 g. of 2-(4'-thiazolyl)benzimidazole and 6 g. of phenothiazine were partly dispersed and partly dissolved in 40 mls. of ethyl oleate containing 5% v./v. of the condensation product of nonylphenol with ethylene oxide which is available under the registered trademark "Lissapol" N. The oily dispersion was shaken up in 250 mls. of water and there was thus obtained a dispersion suitable for treatment of helminthiasis by administration "per os" by means of a drench gun.

EXAMPLE 12

2 parts of 2-phenyl benzimidazole, 4 parts of phenothiazine and 90 parts of chalk were mixed and finely ground. There was thus obtained a composition suitable for treatment of helminthiasis in animals.

EXAMPLE 13

A mixture of 5 parts of 2-(4'-thiazolyl)-5-methylbenzimidazole, 100 parts of phenothiazine and 2 parts of the sodium salt of diisopropylnaphthalene sulphonic acid was thoroughly milled. There was thus obtained a powder readily dispersible in water and the aqueous dispersions so obtained were suitable for the treatment of helminthiasis in mammals.

EXAMPLE 14

60 parts of 2-phenyl benzimidazole, 360 parts of phenothiazine, 2.5 parts of sodium diisopropylnaphthalene sulphonate, 2 parts of sodium bicarbonate, 3.6 parts of magnesium sulphate and 4 parts of liquid paraffin were mixed. There was thus obtained a powder which was readily dispersible in aqueous media to give aqueous dispersions suitable for the treatment of helminthiasis.

EXAMPLE 15

2 grams of 2-furyl benzimidazole hydrochloride were dissolved in 100 mls. distilled water. To this were added 62 parts of a dispersible powder of phenothiazine which had been prepared by thoroughly milling 2 parts of the sodium salt of diisopropylnaphthalene sulphonic acid with 60 parts of phenothiazine. There was thus obtained a dispersion suitable for drenching sheep or cattle by means of a drench gun.

EXAMPLE 16

67.5 g. of technical phenothiazine and 22.5 g. of 2-phenylbenzimidazole were finely ground in a ball mill. 4.5 g. of sodium chloride, 0.5 g. of sodium carbonate, 1.0 g. of oxgall, 1.0 g. of the dispersing agent sodium dibutylnaphthalene sulphonate and 3.0 g. of fine china clay were then added to the mill and the mixture was milled for a further 30 minutes. There was thus obtained a mixture suitable for administration to sheep suffering from helminthiasis.

EXAMPLE 17

A mixture as described in Example 16 was prepared, but the 22.5 g. of 2-phenylbenzimidazole were replaced by 22.5 g. of 2(o-tolyl)benzimidazole. There was thus obtained a mixture suitable for administration to sheep suffering from helminthiasis.

EXAMPLE 18

A mixture as described in Example 16 was prepared, but the 22.5 g. of 2-phenylbenzimidazole were replaced by 22.5 g. of 2-(o-chlorophenyl)benzimidazole. There was thus obtained a mixture suitable for administration to sheep suffering from helminthiasis.

EXAMPLE 19

A mixture as described in Example 16 was prepared, but the 22.5 g. of 2-phenylbenzimidazole were replaced by 22.5 g. of 2-(o-bromophenyl)benzimidazole. There was thus obtained a mixture suitable for administration to sheep suffering from helminthiasis.

EXAMPLE 20

A mixture as described in Example 16 was prepared, but the 22.5 g. of 2-phenylbenzimidazole were replaced by 22.5 g. of 2 - (3,4 - dimethoxyphenyl)benzimidazole. There was thus obtained a mixture suitable for administration to sheep suffering from helminthiasis.

EXAMPLE 21

A mixture as described in Example 16 was prepared, but the 22.5 g. of 2-phenylbenzimidazole were replaced by 22.5 g. of 2-(p-aminophenyl)benzimidazole. There was thus obtained a mixture suitable for administration to sheep suffering from helminthiasis.

EXAMPLE 22

A mixture as described in Example 16 was prepared, but the 22.5 g. of 2-phenylbenzimidazole were replaced by 22.5 g. of 2-(p-dimethylaminophenyl)benzimidazole. There was thus obtained a mixture suitable for administration to sheep suffering from helminthiasis.

EXAMPLE 23

A mixture as described in Example 16 was prepared, but the 22.5 g. of 2-phenylbenzimidazole were replaced by 7 g. of 2-(5'-thiazolyl)benzimidazole. There was thus obtained a mixture suitable for administration to sheep suffering from heliminthiasis.

EXAMPLE 24

A mixture as described in Example 16 was prepared, but the 22.5 g. of 2-phenylbenzimidazole were replaced by 7 g. of 2-(2'-thienyl)benzimidazole. There was thus obtained a mixture suitable for administration to sheep suffering from helminthiasis.

EXAMPLE 25

A mixture as described in Example 16 was prepared, but the 22.5 g. of 2-phenylbenzimidazole were replaced by 22.5 g. of 1-(α-hydroxy-βββ-trichloroethyl)-2-phenylbenzimidazole. There was thus obtained a mixture suitable for administration to sheep suffering from helminthiasis.

I claim:

1. A composition of matter comprising components A and B, where A is selected from the group consisting of 2-substituted benzimidazoles of the formula:

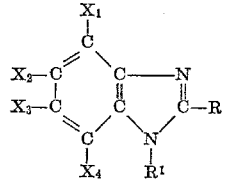

wherein $X_1$, $X_2$, $X_3$ and $X_4$ are selected from the group consisting of hydrogen, halogen, lower alkyl and lower alkoxy; R is selected from the group consisting of thiazolyl; thienyl; furyl; phenyl; o-methylphenyl; o-chlorophenyl; o-bromophenyl; o-nitrophenyl; p-aminophenyl; mono-lower alkylamino-phenyl; di-lower alkylamino-phenyl; and pyridyl; and $R^1$ is selected from the group consisting of hydrogen, lower alkyl, lower alkenyl, and a $\beta\beta\beta$-trichloro-$\alpha$-hydroxyethyl group; and the non-toxic acid addition salts of said benzimidazoles, and where B is phenothiazine.

2. A composition of matter described in claim 1, where compound A is 2-phenylbenzimidazole.

3. A composition of matter described in claim 1, where compound A is 2-(2'-thienyl)benzimidazole.

4. A composition of matter described in claim 2, comprising between 100 and 400 parts of phenothiazine per 25 to 150 parts of 2-phenylbenzimidazole.

5. A composition of matter described in claim 2, comprising between 200 and 300 parts of phenothiazine per 50 to 100 parts of 2-phenylbenzimidazole.

6. An anthelmintic composition comprising a composition of matter described in claim 1 together with an inert non-toxic carrier for the active ingredients A and B.

7. A composition of matter described in claim 1, further comprising at least one biologically active ingredient selected from the group consisting of cyanacethyldrazide, hexachloroethane, piperazine, 1-diethylcarbamyl-4-methyl-piperazine, carbon tetrachloride, 3,3',5,5',6,6'-hexachloro-2:2'-dihydroxy diphenylmethane, sodium bicarbonate, and tetrachlorethylene.

8. A composition of matter described in claim 1 in which the phenothiazine is between 75% and 100% pure.

9. A composition of matter described in claim 1 in which the phenothiazine has a specific surface area of between 3,000 cm.$^2$/g. and 30,000 cm.$^2$/g.

10. A method of biological treatment of domestic animals infested by helminths whereby a composition of matter described in claim 1 is administered "per os."

11. A method of biological treatment of domestic animals infested by helminths whereby a composition of matter described in claim 2 is administered "per os."

12. A method of biological treatment of domestic animals infested by helminths whereby a composition of matter described in claim 2, is administered "per os" to sheep in a dosage between 25 and 100 mg. of 2-phenylbenzimidazole and between 100 and 400 mg. of phenothiazine per kg. of bodyweight of the sheep.

13. A method of biological treatment of domestic animals infested by helminths whereby a composition of matter described in claim 2, is administered "per os" to sheep in a dosage between 50 and 100 mg. of 2-phenylbenzimiddazole and between 200 and 300 mg. of phenothiazine per kg. of bodyweight of the sheep.

No references cited.